Aug. 2, 1960   L. K. GULTON   2,947,887
COOLED PIEZOELECTRIC ACCELEROMETER
Filed Nov. 20, 1956   2 Sheets-Sheet 1
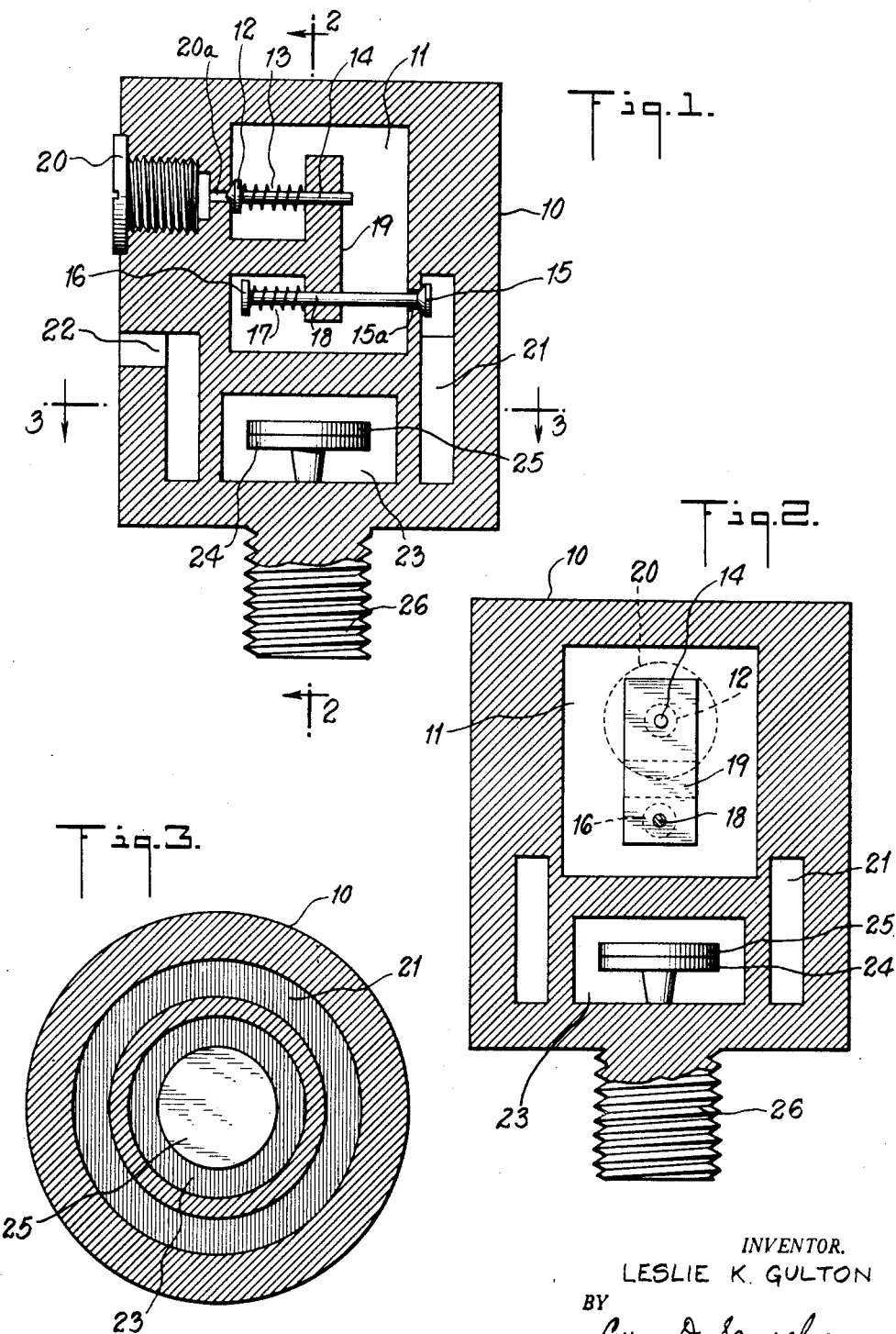
INVENTOR.
LESLIE K. GULTON
BY
Cyrus D. Samuelson
ATTORNEY Aug. 2, 1960　　　　L. K. GULTON　　　　2,947,887
COOLED PIEZOELECTRIC ACCELEROMETER
Filed Nov. 20, 1956　　　　　　　　　　2 Sheets-Sheet 2
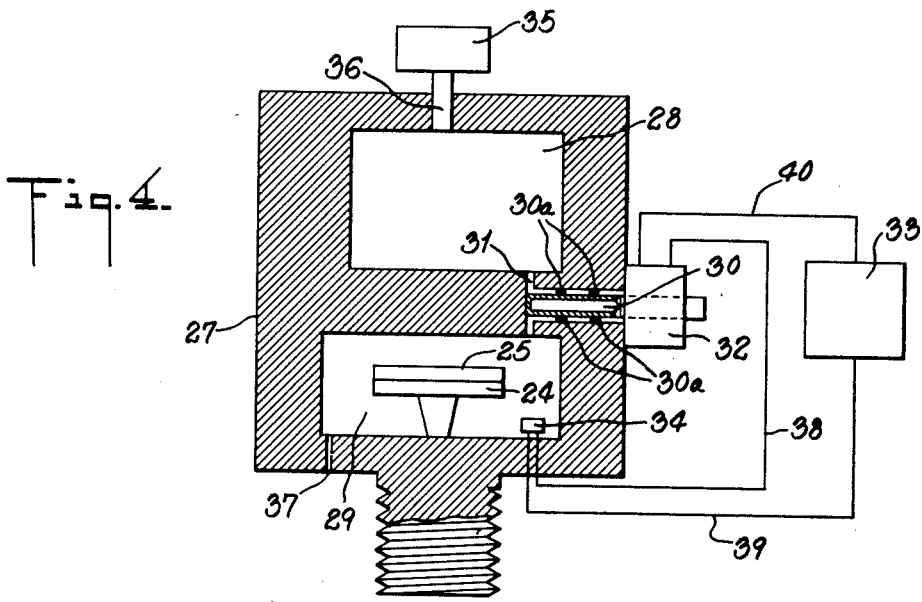
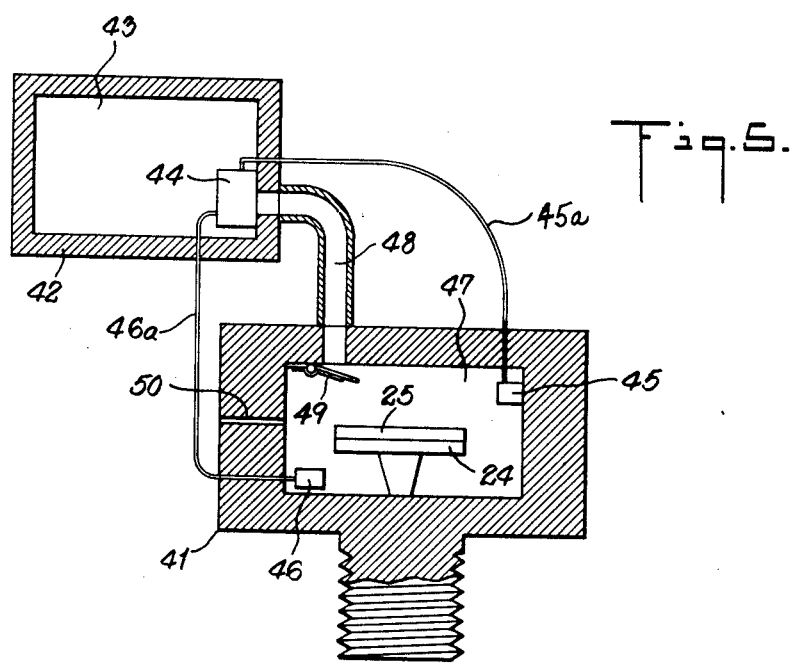
INVENTOR.
LESLIE K. GULTON
BY
Cyrus D. Samuelson
ATTORNEY United States Patent Office 2,947,887
Patented Aug. 2, 1960

2,947,887

COOLED PIEZOELECTRIC ACCELEROMETER

Leslie K. Gulton, % Gulton Industries, Inc.,
212 Durham Ave., Metuchen, N.J.

Filed Nov. 20, 1956, Ser. No. 623,340

4 Claims. (Cl. 310—8.4)

My invention relates to accelerometers and in particular to accelerometers which do not overheat while being used in a high temperature environment.

At the present time, it is difficult to employ accelerometers in a high temperature environment because the sensitivity of the transducer is reduced when it is operated above a certain temperature. This temperature varies depending upon the material of which the transducer is composed but all transducers are adversely affected, to a greater or lesser degree, by high temperatures.

More and more need has developed for making shock and vibration measurements in high temperature environments. It has become increasingly important to be able to make accurate shock and vibration measurements in various phases of rocket, guided missile, and jet engine development and research. All of these fields along with many others are exemplifications of high temperature environments in which it is necessary to make shock and vibration measurements.

Accordingly, it is a principal object of my invention to provide an accelerometer which may be employed to make shock and vibration measurements in high temperature environments.

A further object of my invention is to provide an accelerometer which is self-cooling after the ambient temperature reaches a predetermined value.

A still further object of my invention is to provide a self-cooling accelerometer wherein the chamber containing the cooling agent is an integral part of the accelerometer.

A still further object of my invention is to provide a self-cooling accelerometer wherein the chamber containing the cooling agent is separate from the accelerometer housing.

A still further object of my invention is to provide self-cooling accelerometers which may be manufactured and fabricated simply and economically.

These and other objects, advantages, features and uses will become more apparent as the description proceeds when considered in view of the accompanying drawings, in which:

Figure 1 is a side elevational view, partly in cross-section, of a preferred embodiment of my invention, Figure 2 is a cross-sectional view along the line 2—2 of Figure 1, Figure 3 is a cross-sectional view along the line 3—3 of Figure 1, Figure 4 is a view, similar to that of Figure 1, of a further embodiment of my invention, and Figure 5 is a view, similar to that of Figure 1, of a still further embodiment of my invention.

In the drawings, wherein like numerals are employed to designate like parts throughout the same and wherein are shown preferred embodiments of my invention, the numeral 10 designates the accelerometer housing. Gas chamber 11 has two openings: filling port 20a and exit port 15a. Rod 14 is mounted so as to be movable in support 19 and in conjunction with spring 13 serves to hold check valve 12 closed against port 20a. Filler plug 20 seals port 20a from the outside. Rod 18 is movable in support 19 and in conjunction with spring 17 and pressure stop 16 serves to hold check valve 15 closed against port 15a. When the gas pressure in 11 increases above a predetermined value, 15 opens 15a and the gas enters expansion chamber 21 and leaves housing 10 through exit port 22. Chamber 23 houses active element 24 together with its mass load 25. Mounting stud 26 is utilized to fixedly attach the unit to the frame or other structure under measurement.

Housing 27 contains active element chamber 29 and gas supply chamber 28. Valve stem 30 moves so as to open and close gas channel 31 between 28 and 29. O-rings 30a serve to keep 31 gas tight and prevent the escape of any gas from housing 27. Double solenoid 32 serves to move valve stem 30 and thereby open and close 31. Voltage source 33 (details not shown) serves to supply actuating voltage to 32 through wiring 40 when activated by temperature sensitive element 34 through wiring 39. Wiring 38 completes the circuit from 32 to 34. External gas chamber 35 feeds refill gas to 28 through gas entry port 36. Gas exit port 37 bleeds off the expanded gases in 29.

Housing 41 contains active element chamber 47 and housing 42 contains gas chamber 43. Valve 44 is opened by the action of thermal control 45 acting through wiring 45a and closed by the action of thermal control 46 acting through wiring 46a. Gas flows from 43 to 47 through channel 48. When the gas flows it pushes the spring loaded seal 49 to the open position.

It is within the contemplation of my invention to use certain of the elements illustrated in one embodiment in combination with those of another embodiment. For example, the embodiment of Figures 1, 2 and 3 may utilize the external gas chamber of Figure 4 and similarly, the embodiment of Figure 4 may be equipped with the filler port and seal of Figure 1 (or an equivalent mechanism) in lieu of the external gas chamber illustrated. Other combinations of elements may also be employed.

While I prefer to use a mass-loaded titanate ceramic transducer as the active element of my accelerometer and a stud for mounting the unit to the structure under measurement, other active elements, both loaded and unloaded, and other mounting methods may also be utilized.

Accelerometers of my invention are cooled as a result of the expansion of a gas. The following example is presented for illustrative purposes, without any intent to limit the scope of my invention:

Assume that $CO_2$ will act as a perfect gas, in that it will obey the equation: $PV=MRT$.

Therefore, the pressure or volume increases linearly with temperature.

I shall consider a chamber containing 1 cubic inch of $CO_2$ at a pressure of 3000 lbs. per sq. in. and a rise in temperature from 70° F. (530° Rankine) to 200° F. (660° Rankine). A by-pass chamber is provided to receive the excess volume of $CO_2$. Then substituting in the equation $$\frac{V_1}{T_1}=\frac{V_2}{T_2}$$

we get $$\frac{1}{530}=\frac{V_2}{660}$$

and $V_2=1.25$ in.$^3$.

Therefore, .25 in.$^3$ of $CO_2$ at a pressure of 3000 lbs. per sq. in. escapes to the by-pass chamber at a pressure of 50 lbs. per sq. in.

Assuming an adiabatic expansion $$\frac{T_1}{T_2} = \left(\frac{P_1}{P_2}\right)^{\frac{k-1}{k}}$$

we obtain $$\frac{660}{T_2} = \left(\frac{3000}{50}\right)^{\frac{.3}{1.3}}$$

and $$T_2 = \frac{660}{(60)^{.23}} = 260° \text{ Rankine} = -200° \text{ F.}$$

From the equation $PV = MRT$, we obtain $$R = \frac{PV}{MT} = \frac{15 \times 144 \times 8.1}{1 \times (32 + 460)}$$

and $R = 35.6$ ft.-lb. per lb. per ° F. abs. (Rankine) and $$M = \frac{PV}{RT} = \frac{3000 \times 144 \times .25 \times 12}{35.6 \times 660 \times 144 \times 144} = .00264 \text{ lb.}$$

The cooling effect Q is given by the equation:

$$Q = MC_v(T_2 - T_1) = .00264 \times .153(260 - 660) = .162 \text{ B.t.u.}$$

If the original heating is from 70° F. to 200° F., it is necessary to cool back to 70° F. (a cooling of 130° F.) For water:

$$\frac{.162}{130} = .0012 \text{ lb.}$$

of water may be cooled 130° F.
For aluminum (specific heat=.226):

$$\frac{.0012}{.226} = .0053 \text{ lb.}$$

of aluminum which may be cooled 130° F.

Therefore, the permissible weight of aluminum surrounding the transducer if 1 in.³ of $CO_2$ is available for cooling at a pressure of 3000 lbs. per sq. in.=.0533× 453.6=2.4 grams approximately.

Aluminum has a density of 2.78 gm./cc., so that it is possible to cool .86 cc. of aluminum under the above conditions.

It can, therefore, be seen that, within the normal limits of weight and volume of accelerometers, it is possible to provide cooling of up to 130° F. using $CO_2$ as the cooling agent. Other cooling agents such as Freon and like gases may be employed with equally satisfactory or better results.

In Figures 1, 2 and 3, housing 10 is formed of some lightweight metal such as aluminum and contains gas chamber 11, expansion chamber 21 and transducer chamber 23. Support 19 is mounted to housing 10 within gas chamber 11 and is equipped with channels within which rods 14 and 18 are free to move longitudinally. Spring 13 is wound around rod 14 and is affixed at one end to 19 and at the other end bears against check valve 12 which is affixed to the end of rod 14. Check valve 12 serves to close port 20a and is held in place by the action of spring 13.

Check valve 15 serves to close port 15a under normal conditions of temperature and pressure and is held in the closed position by rod 18, to whose end it is affixed, and the action of spring 17. Spring 17 is wound around rod 18 and bears against 19 and pressure stop 16 which is affixed to the end of rod 18.

To fill 11 with gas under pressure, filler plug 20 is removed and gas under pressure forces check valve 20 away from port 20a and permits gas to enter 11. When the proper volume of gas at the desired pressure is in 11, filler plug 20 is threaded into housing 10 and check valve 12 closes port 20a due to the pressure of the gas in 11 and the action of spring 13.

When the gas in 11 is heated above a predetermined temperature, the pressure of the gas will rise and by acting on 16 will compress spring 17; check valve 15 is forced out to open port 15a and some of the gas enters expansion chamber 21. As soon as sufficient gas enters 21 so that the pressure in 11 cannot overcome the action of spring 17, check valve 15 is forced to close and no more gas enters 21 from 11. The gas from 21 escapes to the outer, surrounding medium through exit port 22.

The entry of the gas into 21 and its consequent reduction in pressure results in a cooling effect as illustrated in the example given above. This resultant cooling of the accelerometer active element and housing permits measurements of shock and vibration to be made in high temperature environments for longer periods of time than has been possible heretofore with accelerometers which are not self-cooling.

Figure 4 illustrates a second embodiment of my invention. Gas is placed in chamber 28 under pressure from supply 35 through entry port 36 (details not shown). Voltage to actuate solenoid 32 is supplied from 33 (details not shown) which may, for example, be a part of the amplifier or cathode follower normally used with accelerometers. A time delay may be incorporated in 33 so that valve 30 does not close until all the gas from 28 has expanded into 29. The refilling of 28 from 35 may likewise be timed so that 28 is not refilled until the gas originally contained therein has been emptied into 29.

If desired, a baffle or several baffles (not shown) may be inserted in 29 at the point of entry of 31 and in various locations in 29 so that 34 will be cooled last and the gas will remain in 29 as long as possible. 34 may also be used to actuate 32 to close 31 when the desired temperature has been reached in 29. In such a case no time delay need be used in 33 and 28 may be refilled from 35 after 31 has reclosed (details of controls not shown).

Figure 5 illustrates a still further embodiment of my invention. Temperature sensitive element 45 serves to open valve 44 (details not shown) when the temperature in 47 reaches a predetermined value. Gas flows from 43 through 48 to 47 until the temperature is reduced to a second predetermined value. Valve 44 is then closed through the action of temperature sensitive element 46. Seal 49 is forced open when valve 44 is open and is pushed closed by the action of its associated spring when 44 is closed.

Persons skilled in the art will be aware that it is necessary to keep accelerometers, which use active ceramic transducer elements composed of barium titanate or like material, at temperatures below the transformation temperature of the ceramic in order for the accelerometers to retain their activity and remain operative. However, the techniques and devices disclosed herein are equally effective for cooling accelerometers which utilize other types of active elements and while I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. An accelerometer comprising a housing; a first chamber in said housing; an electro-mechanically sensitive body mounted in said first chamber; a mass loading said electro-mechanically sensitive body; a second chamber in said housing; a gas contained in said second chamber under pressure; means for confining said gas in said second chamber; a third chamber surrounding said first chamber; means for permitting said gas to escape from said second chamber to said third chamber upon reaching a pressure above a predetermined value; and means for exhausting said gas from said third chamber.

2. An accelerometer as described in claim 1 wherein the means for permitting said gas to escape from said second chamber comprises a valve which opens at pressures above a predetermined value.

3. An accelerometer as described in claim 2 wherein said valve is opened by the action of a spring and armature.

4. An accelerometer as described in claim 1 wherein the means for permitting said gas to escape from said second chamber is a valve actuated by temperature sensitive means located in said first chamber.

References Cited in the file of this patent

UNITED STATES PATENTS

| | | |
|---|---|---|
| 1,874,980 | Hansel | Aug. 30, 1932 |
| 1,875,953 | Taylor | Sept. 6, 1932 |
| 1,904,140 | Hentschel | Apr. 18, 1933 |
| 1,946,698 | Kummerer | Feb. 13, 1934 |
| 1,962,210 | Osnos | June 12, 1934 |
| 2,012,018 | Osnos | Aug. 20, 1935 |
| 2,097,868 | Beard | Nov. 2, 1937 |
| 2,215,582 | Goldstine | Sept. 24, 1940 |
| 2,643,282 | Greene | June 23, 1953 |
| 2,728,217 | Richardson | Dec. 27, 1955 |
| 2,734,096 | Ennis | Feb. 7, 1956 |
| 2,808,522 | Dranelz | Oct. 1, 1957 |